May 20, 1924.  
W. K. FLETCHER ET AL  
1,495,009  
VULCANIZING APPARATUS  
Filed July 24, 1922  2 Sheets-Sheet 1
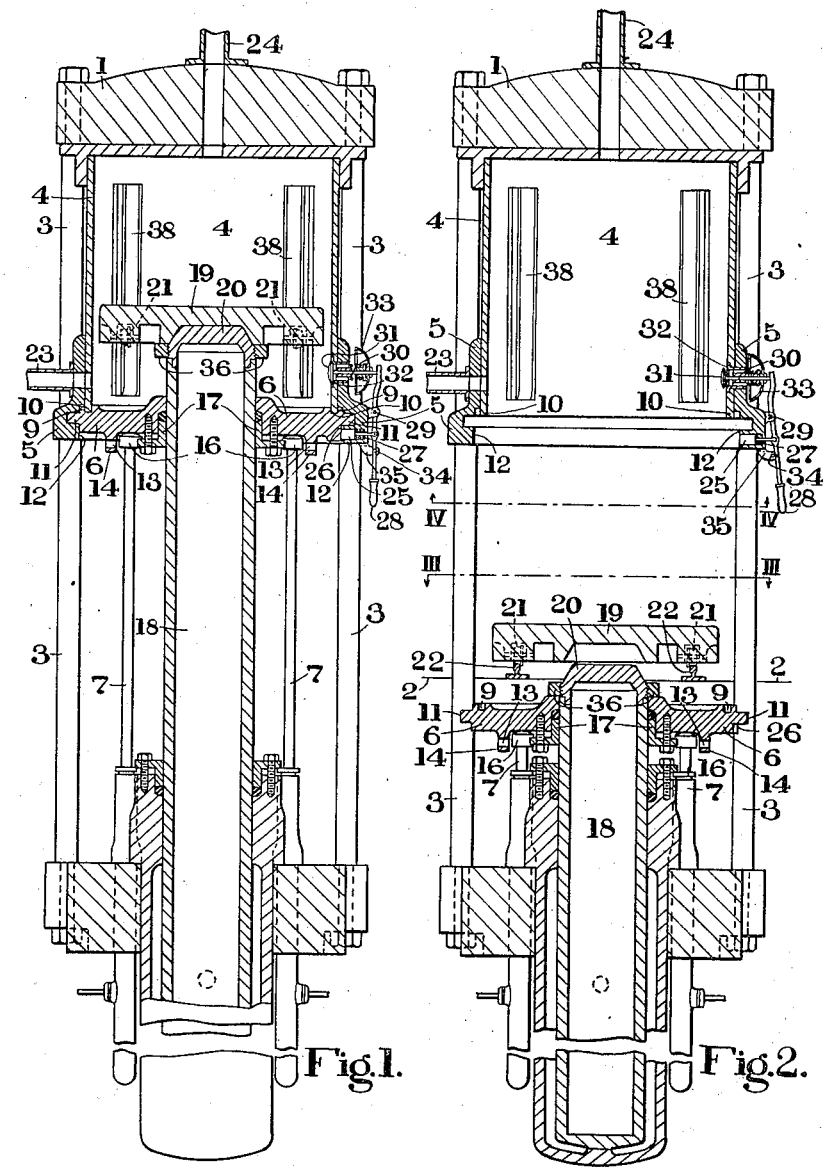
Inventors  
W. K. Fletcher  
J. Rushmer  
by  
Att'y

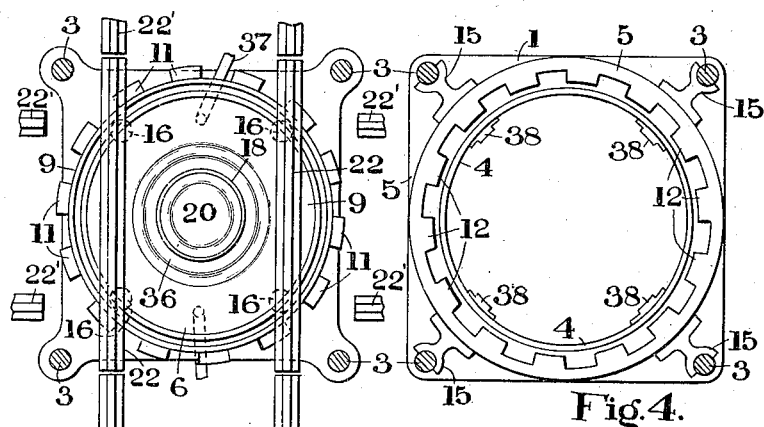
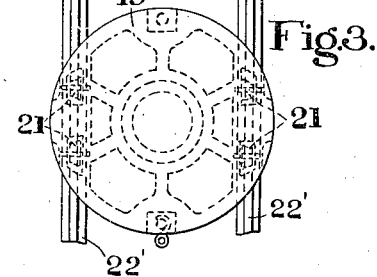

Patented May 20, 1924.

1,495,009

UNITED STATES PATENT OFFICE.

WALTER KIRKBANK FLETCHER AND JOHN RUSHMER, OF LONDON, ENGLAND.

VULCANIZING APPARATUS.

Application filed July 24, 1922. Serial No. 577,247.

*To all whom it may concern:*

Be it known that we, WALTER KIRKBANK FLETCHER and JOHN RUSHMER, both subjects of the King of Great Britain, residing at London, England, have invented certain new and useful Improvements in Vulcanizing Apparatus, of which the following is a specification.

This invention relates to combined presses and pans for vulcanizing or curing automobile tyres and other moulded rubber articles.

In apparatus of this kind hitherto employed, a mould table is adapted to be raised and lowered within a pan or curing chamber by means of a hydraulic ram, the top of the pan being fitted with a heavy cover or being forced up against a stationary head by auxiliary rams, so that, when the pan is closed and the moulds are highly compressed between the mould table and the cover or head, steam can be admitted to the pan. As the moulds have to be inserted and removed from the pan at the upper end thereof, it is usual, in order to bring that end to the floor level, of the factory, to build the apparatus in a pit or basement which usually necessitates expensive excavation and concrete or masonry work. In spite of the top of the pan being at floor level, considerable labour is involved in inserting and removing the moulds, especially when a fixed head is used.

Moreover, the accumulation of rubber residue in the bottom of the pan necessitates frequent cleaning in order to avoid choking of drain and other outlets, the inspection and cleaning being dangerous. A further disadvantage of the known apparatus is that the pan has to be left open after each operation in order to allow the moulds to cool. This not only means loss of time but the apparatus is subjected to sudden changes in temperature.

The object of the present invention is to avoid the above difficulties and in such a way that the output of the apparatus is increased very considerably.

According to the invention the ram is adapted to remove the mould table from the curing chamber or pan after each curing operation, and to an extent sufficient to permit of the pile of moulds being removed and replaced by another pile of moulds en bloc. The pan is preferably stationary and inverted, so that the mould table is at floor level, when fully withdrawn from the pan, and the pile of moulds may be carried by a trolley adapted to be run in and out of the press, the table itself being preferably removable from the ram and being formed as a trolley.

One trolley or table with a pile of moulds can be thus replaced quickly by another at the end of each curing operation, so that the interval between succeeding curing operations is reduced to a minimum, and cooling of the apparatus is avoided.

The invention also includes means for rapidly closing the pan, and safety device for avoiding premature opening of the pan while under steam, and other details hereinafter referred to.

One form of apparatus according to the invention is illustrated by way of example in the accompanying drawings, wherein Figures 1 and 2 are sectional elevations respectively showing the mould table inside and removed from the pan.

Figure 3 is a sectional plan on III—III Figure 2.

Figure 4 is a sectional underside view on the line IV—IV Figure 2.

In the form illustrated a heavy cast iron head or abutment 1 is mounted at a suitable height above floor level 2 on steel columns 3. An inverted curing chamber or pan 4 is attached to the head 1. The lower rim 10 of the pan 4 is fitted with a locking ring 5 adapted to co-operate with a cover 6. The cover 6 is raised and lowered by suitable means such as auxiliary rams 7. The cover 6 has a packing groove 9 to receive the rim 10 of the pan 4 which projects beyond the locking ring 5 for this purpose.

A series of wedge shaped lugs 11 is provided on the periphery of the cover 6, and a corresponding series of lugs 12 is provided on the inner surface of the ring 5. The cover 6 is capable of limited rotary movement on its rams 7 and when it is in one position, for instance when being applied to and removed from the pan 4, its lugs 11 are free to pass between the lugs 12 on the ring 5. On a slight rotation of the cover 6 when applied to the pan 4, the two series of lugs 11 and 12 co-operate to force the cover 6 tightly to close the pan 4. The cover 6 may be rotated by crow-bars inserted into holes 13 in lugs 14 on its underside. The heads 16 of the rams 7 may be rounded as shown to reduce frictional engagement with the cover.

The pan is steadied at its lower end by brackets 15 Figure 4, on the locking ring 5, embracing the columns 3 supporting the head 1.

The cover 6 is provided with a central aperture, fitted with a gland 17, through which the main ram 18 slides. The upper end of the main ram 18 supports the mould table 19 having for instance, a tapered boss, 20 adapted to fit a recess in the underside of the table, permitting of removal of the table, but holding it central when in position. A safety ring 36 may be provided on the upper end of the ram 18 below the table 19, so that in the event of a failure in the hydraulic pressure during vulcanizing, the ram and its load will be brought to rest on the inner surface of the cover 6. The table 19 is fitted with rollers 21 on its underside, and when the cover 6 and table 19 have been lowered to their full extent clear of the pan as shown in Figure 2, the rollers 21 engage with and support the table 19 on portable rails 22 inserted for the purpose of enabling the table 19 to be run off the main ram 18, and another loaded table to be run in position onto the main ram. Several rail tracks 22' on the floor 2, Figure 3, may radiate from the apparatus to facilitate rapid removal and replacement of the trolleys or tables 19.

When a table 19 loaded with moulds is run into the operative position on the main ram 18, the portable rails 22 are removed as the main ram begins to rise and takes the load. The table 19 with its load of moulds is then raised into the pan 4, Figure 1. Suitable guides such as rails 38 may be provided in the pan 4 to ensure alignment of the table and the ram 18. The cover 6 is applied to the pan 4 by the auxiliary rams 7. The cover 6 is rotated to co-operate with the locking ring 5, to effect a steam-tight joint, and the moulds are squeezed against the head 1, by the main ram 18. Steam at adequate pressure is admitted to the pan by a pipe 23.

After the required interval of time the steam is cut off and is exhausted through a suitable outlet pipe 24. The pressure of the auxiliary rams 7 is then applied to take the weight of the cover 6 which cover is next rotated to release it from the locking ring 5.

The cover 6 and the main ram 18 with its loaded table 19 are then free to be lowered from the pan 4 the table removed and replaced by another and the process repeated.

Suitable flexible connections 37 may be provided on the cover 6 to permit of drainage while the pan is under steam.

In order to avoid premature opening of the pan 4, while under steam, a safety-device or lock is provided which has to be unlocked before the cover 6 can be rotated and freed from the locking ring 5.

The safety-device is so arranged that it cannot be unlocked without opening a valve on the pan so that a warning is given to the operator should he attempt to unlock the cover while there is steam in the pan.

In one form the safety-device comprises a detent 25 mounted on the locking ring and engaging with teeth 26 on the cover 6 under the action of a spring 27. A hand lever 28 pivoted at 29 on the locking ring 5, is provided to enable the operator to disengage the detent 25 from the teeth 26. When the lever 28 is moved for this purpose it presses against the stem 30 of a valve 31 on the pan 4, and moves it off its seating 32.

If there be sufficient steam pressure in the pan 4 steam will escape past the valve 31 and warn the operator. A shield 33 is preferably fitted to avoid injury to the operator. The lever 28 may be locked temporarily with the detent 25 out of engagement with the teeth 26 by a pin 34 inserted through a hole in a suitable lug 35 on the locking ring, the pin engaging behind the lever 28 to hold it in the position indicated in Figure 2.

We claim:

1. A combined press and pan for vulcanizing or curing automobile tyres and other rubber articles, comprising a pan, an abutment, a mould table and a ram for moving said mould table, relatively to said pan and abutment, said ram being adapted to withdraw said mould table from said pan, at the end thereof remote from said abutment into a position remote from said pan for the purpose of enabling a pile of moulds to be removed and replaced by another pile of moulds en bloc.

2. A combined press and pan for vulcanizing or curing automobile tyres and other rubber articles, comprising a stationary pan, a fixed abutment at one end thereof, a cover for the end of the pan opposite to said abutment, means for applying said cover to said pan and for removing it therefrom, and a ram supporting a mould table and adapted to move it into said pan and out therefrom to a position sufficiently remote from said pan to enable a pile of moulds to be removed from said table and replaced by another pile en bloc, substantially as and for the purpose hereinbefore set forth.

3. A combined press and pan for vulcanizing or curing automobile tyres and other rubber articles, comprising a stationary pan, a cover at one end thereof, forming an abutment, a removable cover at the opposite end, a mould table in the form of a trolley, and rams for moving said removable cover and said mould table relatively to said pan and for removing both to positions sufficiently remote from the pan to permit of the removal of the mould table, from the press with a pile of moulds thereon.

4. A combined press and pan for vulcanizing or curing automobile tyres and other rubber articles, comprising a stationary pan, a cover at one end thereof forming an abutment, a removable cover at the opposite end, means for locking said removable cover to said pan when in closing position thereon, a mould table, in the form of a trolley, and rams for moving said removable cover and said mould table relatively to said pan and for removing both to positions sufficiently remote from the pan to permit of the removal of the mould table, from the press with a pile of moulds thereon.

5. A combined press and pan for vulcanizing or curing automobile tyres and other rubber articles, comprising a stationary pan, closed and having an abutment at one end thereof, a removable cover at the opposite end, means for moving said removable cover to and from the pan, a ram passing through said removable cover, and a mould table on said ram, substantially as and for the purpose hereinbefore set forth.

6. A combined press and pan for vulcanizing or curing automobile tyres and other rubber articles, comprising a stationary pan, closed and having an abutment at one end thereof, a removable cover at the opposite end, means for moving said removable cover to and from the pan, a ram passing through said removable cover, a mould table on said ram, means for supplying steam to said pan, means for locking said removable cover to said pan, when in closing position thereon, a warning valve on said pan and means co-operating with said locking means and said valve for the purpose of preventing release of said locking means until said valve has been opened, substantially as and for the purpose hereinbefore set forth.

7. A combined press and pan for vulcanizing or curing automobile tyres and other rubber articles, comprising a stationary pan, closed and having an abutment at one end thereof, a removable cover at the opposite end, means for moving said removable cover to and from the pan, a ram passing through said removable cover, a mould table on said ram, and interlocking means on said pan and removable cover operable by a relative rotary movement, substantially as and for the purpose hereinbefore set forth.

8. A combined press and pan for vulcanizing or curing automobile tyres and other rubber articles, comprising a stationary pan, closed and having an abutment at one end thereof, a removable cover at the opposite end, means for moving said removable cover to and from the pan, a ram passing through said removable cover, a mould table on said ram, and interlocking means on said pan, and removable cover operable by a relative rotary movement, comprising lugs on said removable cover, spaced apart and a rotary ring on said pan also having lugs spaced apart and adapted on rotation of said ring to co-operate with the lugs on said removable cover, substantially as and for the purpose hereinbefore set forth.

9. A combined press and pan for vulcanizing or curing automobile tyres and other rubber articles, comprising a stationary inverted pan, permanently closed at its upper end and having a removable cover for its lower end, an abutment head for the upper end of said pan, a mould table, a main ram for moving said table into and out of said pan, said main ram passing through said removable cover, and auxiliary rams for moving said removable cover to and from the adjacent end of said pan, substantially as and for the purpose hereinbefore set forth.

10. A combined press and pan for vulcanizing or curing automobile tyres and other rubber articles, comprising a stationary inverted pan, permanently closed at its upper end and having a removable cover for its lower end, and abutment head for the upper end of said pan, a mould table, a main ram for moving said table into and out of said pan, said main ram passing through said removable cover, auxiliary rams for moving said removable cover to and from the adjacent end of said pan, said main and auxiliary rams being adapted to lower said cover and mould table into a position sufficiently remote from said pan to permit of the insertion or removal of a pile of moulds en bloc, from the press, substantially as and for the purpose hereinbefore set forth.

11. A combined press and pan for vulcanizing or curing automobile tyres and other rubber articles, comprising a stationary inverted pan, permanently closed at its upper end and having a removable cover for its lower end, an abutment head for the upper end of said pan, a removable mould table, in the form of a trolley, a main ram for moving said table into and out of said pan, said main ram passing through said removable cover, auxiliary rams for moving said removable cover to and from the adjacent end of said pan, rail tracks adjacent to said press and spaced well below said pan, said main ram being adapted to lower said mould table to the level of said rail tracks, and means for guiding said table onto and off said rail tracks and said main ram, substantially as and for the purpose hereinbefore set forth.

In testimony whereof we have signed our names to this specification.

WALTER KIRKBANK FLETCHER.
JOHN RUSHMER.